June 10, 1958     G. S. JENKINS ET AL     2,838,343
ENDLESS TRACK TAKE UP AND LOCK
Filed Jan. 5, 1956
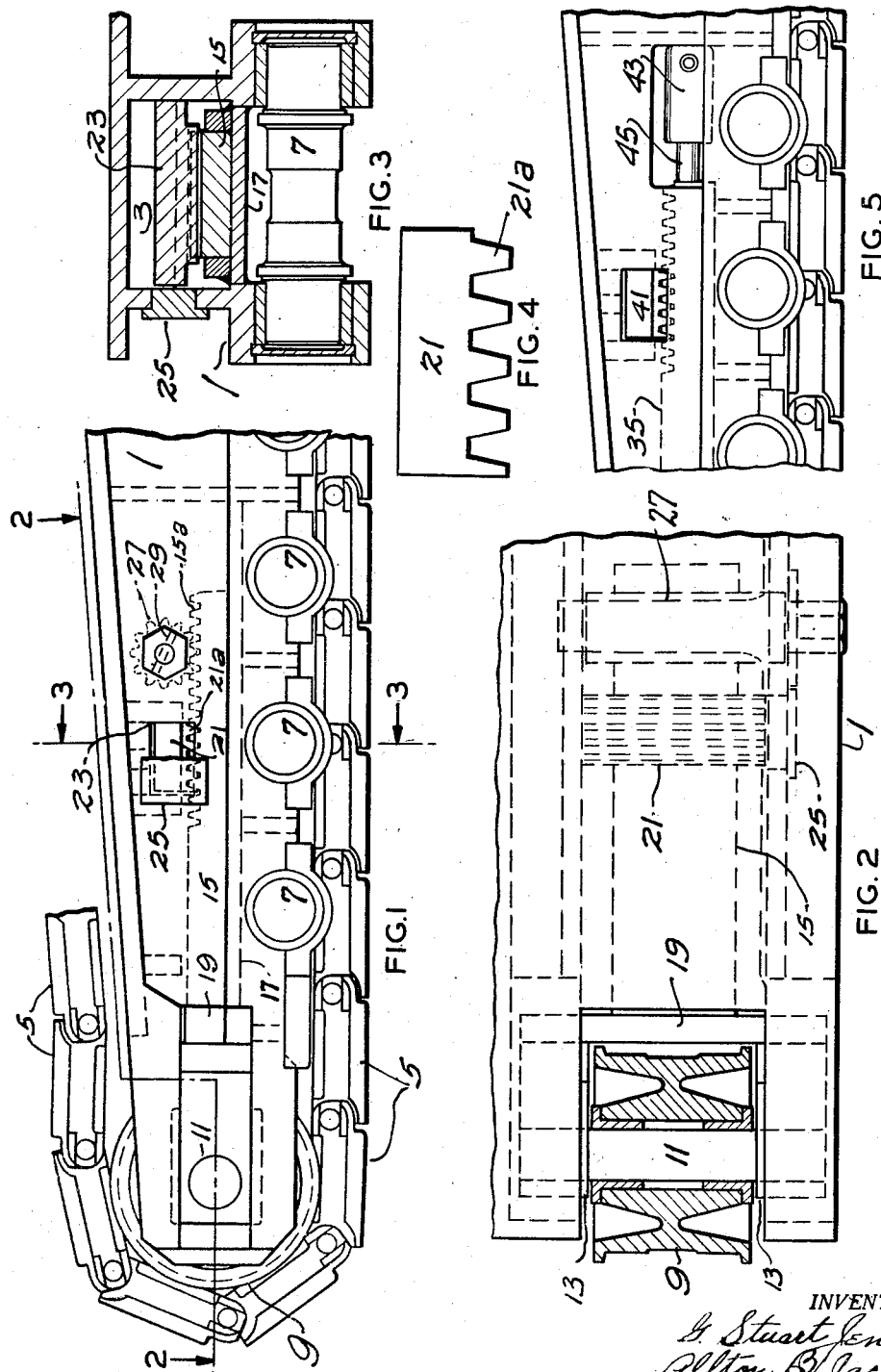
INVENTOR.
G. Stuart Jenkins
Allton B. Jackson
By Rodney Bedell
atty.

United States Patent Office 2,838,343
Patented June 10, 1958

2,838,343

ENDLESS TRACK TAKE UP AND LOCK

Gerald Stuart Jenkins and Allton B. Jackson, Nashville, Ill., assignors, by mesne assignments, to National Mine Service Company, Pittsburgh, Pa., a corporation of West Virginia Application January 5, 1956, Serial No. 557,584

7 Claims. (Cl. 305—9)

The invention relates to a take up and lock structure for endless tracks such as are used on tractors, bulldozers, earth moving equipment, mining machines, etc.

The main object of the invention is to readily and effectively take up slack in the track of such a vehicle. An additional object is to eliminate the likelihood of uneven mounting of an endless track roller with consequent wear and shortened life of the track parts. These and other detail objects are obtained by the structure illustrated in the accompanying drawings in which:

Figure 1 is a side elevation of the forward portion of a continuous miner used in coal mines and embodying one form of the invention.

Figure 2 is a horizontal section on the line 2—2 of Figure 1.

Figure 3 is a vertical transverse section on line 3—3 of Figure 1.

Figure 4 is a detail view of a locking block, as shown in Figure 1 but drawn to a larger scale.

Figure 5 corresponds to a portion of Figure 1 but illustrates another form of the invention.

The vehicle shown in Figures 1–4 includes a frame 1 having an inverted U-shaped recess 3 for receiving the upper flight of an endless track consisting of a series of links 5 pivoted to each other and passing under a plurality of rollers 7 journaled on and supporting frame 1. The track also passes over rollers at the ends of the track loop, one of which rollers is shown at 9. The roller at the other end of the track loop is not shown but will have a stationary axis as is customary. Roller 9 rotates on a shaft 11 journaled in bearings 13 at its ends which are movable lengthwise of the track and relative to each other.

A backing 15 is slidable in recess 3 lengthwise of the track, being supported by a plate 17 extending across the bottom of the recess. A cross head 19 at the forward end of backing 15 engages the rear faces of bearings 13 and positions the latter, shaft 11 and roller 9 lengthwise of the track.

Backing 15 is locked in adjusted position by a block-like member 21. The upper face of backing 15 is provided with a series of transverse teeth 15a. Member 21 is provided with a series of corresponding teeth 21a. The base of block 21, from which the teeth project, terminates at one end in the upright plane passing through the center line of a block tooth, as indicated at the left hand end of Figure 4. The other end of the base of block 21 terminates in the upright plane passing through the center line of the root between two block teeth, as indicated at the right hand end of Figure 4. The right hand end of block 21, Figure 1, bears against a seat 23 on frame 1 and holds backing 15 against movement to the right.

Block 21 is readily removable from its functioning position by transverse movement through an opening in the side of the frame normally closed by a plug 25. When block 21 is removed, backing 15 may be shifted lengthwise of the track a distance corresponding to the pitch of its teeth and block 21 may be reinserted to hold backing 15 in the adjusted position. By reversing block 21 end for end, backing 15 may be shifted a distance corresponding to one half the pitch of the teeth.

Block 21 and backing 15 form a uniform stop surface for both ends of bearings 13 at opposite ends of shaft 11 and avoid inclination of the shaft as may result from the usual adjustment common to endless track devices in which a separate adjusting screw is provided at each end of the roller shaft. Usually one of these adjusting screws is readily accessible from the outside of the vehicle, while the other adjusting screw is inconvenient of access and frequently an operator will take up slack in the exposed adjustment screw only, because he is indifferent or not aware of the necessity of making an adjustment at the opposite end of the shaft.

Various devices may be used to move the backing to take up slack in the endless track. In Figure 1 a pinion 27 is journaled in the vehicle frame and may be rotated by a crowbar (not shown) inserted into a transverse opening 29 in the pinion.

In the form of the invention shown in Figure 5 the backing 35 and the locking block 41 correspond to those previously described, but the backing is advanced by means of a hydraulic mechanism comprising a cylinder 43 and a piston 45.

Other types of devices for moving the backing may be used without affecting the holding block which provides a single stop for the journal bearing and supports both ends of the bearing. Other variations in the details of the structure may be made without departing from the spirit of the invention and the exclusive use of those modifications coming within the scope of the claims is contemplated.

What is claimed is:

1. In a vehicle having a frame and an endless track including a plurality of links pivotally connected to each other and having spaced rollers over which the track passes, at least one of said rollers having journal bearings positioned at opposite sides of the track and independently movable lengthwise of the track, a single backing for both of said bearings movable lengthwise of the track and positioned intermediate said bearings, means for taking up slack in the track comprising a block-like member between said backing and an opposed face on the frame, said block-like member being accessible from the outer side of the vehicle for removal from the insertion into its functioning position by movement transversely of the frame, there being a series of cooperating selectively interengageable elements on said backing and member.

2. A vehicle according to claim 1 in which the interengageable elements consist of transversely extending grooves and teeth in the backing and member there being a full width tooth at one end of the member, as wide as a groove, and a half tooth at the other end of the member, whereby the reversal of the member end for end will vary the longitudinal position of the backing a distance corresponding to one half the width of one of said grooves.

3. In a vehicle having a frame and an endless track including a plurality of links pivotally connected to each other and having spaced rollers over which the track passes, at least one of said rollers having spaced journal bearings spaced apart transversely of the track and movable independently lengthwise of the track, a single rigid backing for both of said bearings movable lengthwise of the track, said backing being positioned intermediate said bearings and having a plurality of transversely extending teeth arranged in succession lengthwise of the track, an adjusting block having a series of teeth selectively enmeshed with said backing teeth and having a base projecting vertically from its teeth, one end of said base being in the plane of the center line of a block tooth and the other end of said base being in the center line of the root between two block teeth, the frame having a rigid seat for the block whereby the reversal of the block end for end and the meshing of its teeth with the backing teeth will vary the effective length of the block and positively position the backing lengthwise of the frame.

4. In a vehicle having a frame and an endless track including a series of interconnected links passing over spaced rollers with their axes disposed horizontally and transversely of the vehicle, one of the rollers having transversely spaced journal bearings mounted independently on the frame and movable lengthwise of the vehicle, a single rigid backing for both said journal bearings, there being opposed upright elements on the frame and the backing facing toward each other but at different levels, and a block insertible from the side of the tractor transversely of the track between said elements and having lower portions at its ends for selectively engaging the backing upright element by reversing the block end for end, and having higher portions at its ends for engaging the frame upright element whereby the backing and its roller are held in spaced relation to the other roller, the lower and upper portions of the block at one end being substantially flush with each other and the lower and upper portions of the block at the other end being offset from each other lengthwise of the block so that reversing the block end for end will vary the distance between the frame element and the backing element.

5. In a vehicle having an endless track and a frame carried thereby, rollers at the ends of the track loop over which the track passes, journal bearings for opposite ends of one of said rollers movable relative to each other lengthwise of the track, a single member extending transversely of the vehicle track and engaging both of said bearings for simultaneously positioning both of said journal bearings, a single device for positively holding said member against relative movement toward the roller at the other end of the track loop, said device including an element seated against a rigid part of the vehicle frame and removable in a direction transversely of the track, and a single operative mechanism for positively moving said member away from the roller at the opposite end of the track loop.

6. A vehicle structure as described in claim 5 in which the member moving mechanism comprises a single pinion, journaled in the vehicle frame, and a single rack therefor on the journal bearing positioning member and having an engagement with said member intermediate the ends of the latter.

7. A vehicle structure according to claim 5 in which the member moving means comprises a single hydraulic cylinder, mounted on the vehicle frame, and a single piston therein operatively engaging said member intermediate the ends of the latter.

References Cited in the file of this patent
UNITED STATES PATENTS

| | | |
|---|---|---|
| 293,383 | Wagner | Feb. 12, 1884 |
| 2,716,577 | Land | Aug. 30, 1955 |

UNITED STATES PATENT OFFICE
CERTIFICATE OF CORRECTION

Patent No. 2,838,343                                      June 10, 1958

Gerald Stuart Jenkins et al.

It is hereby certified that error appears in the printed specification of the above numbered patent requiring correction and that the said Letters Patent should read as corrected below.

Column 2, line 48, for "from the" read -- from and --.

Signed and sealed this 23rd day of September 1958.

(SEAL)
Attest:

KARL H. AXLINE                                             ROBERT C. WATSON

Attesting Officer                                        Commissioner of Patents